Patented Mar. 13, 1945

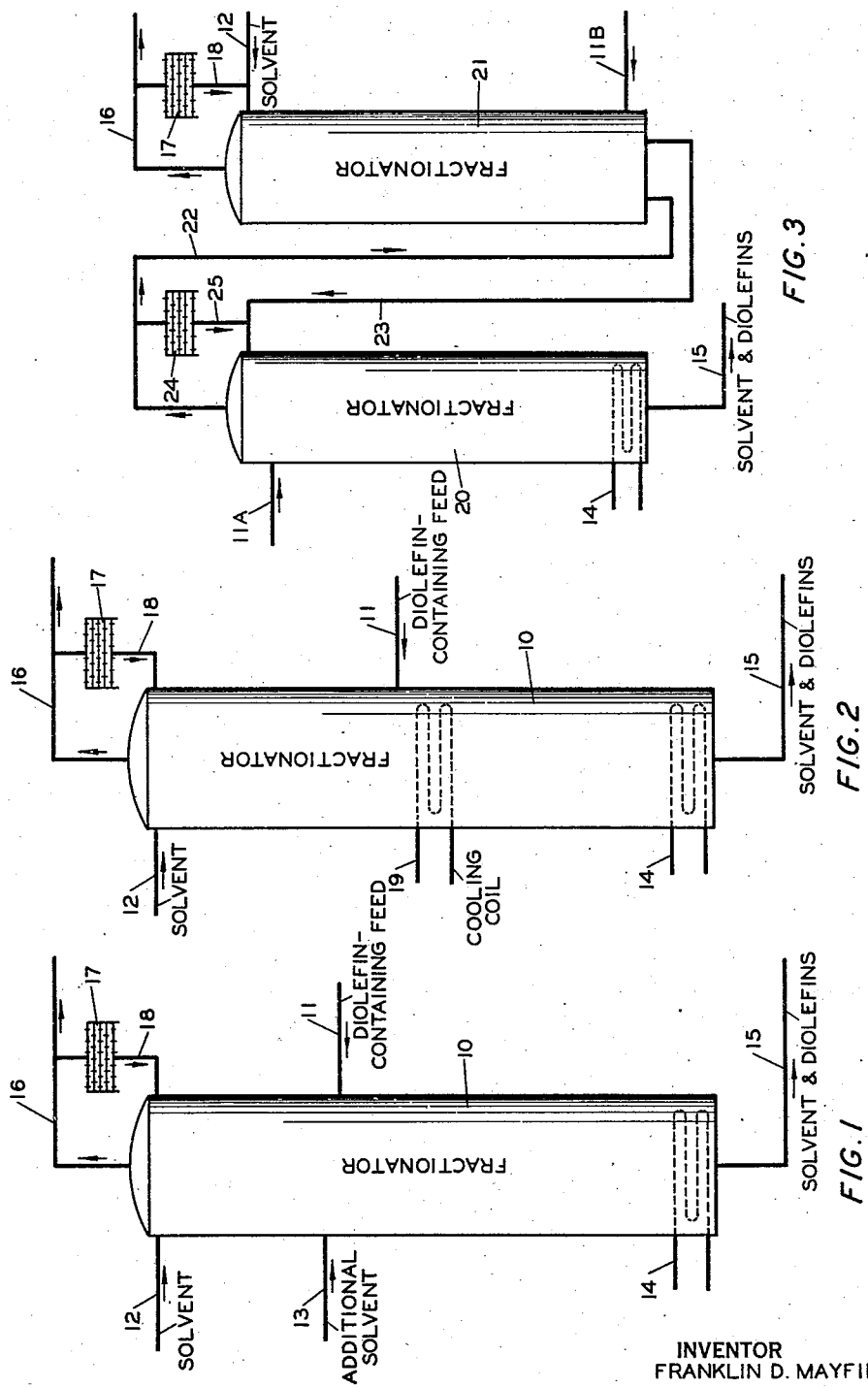

2,371,342

UNITED STATES PATENT OFFICE 2,371,342

PROCESS FOR TREATING HYDROCARBONS

Franklin D. Mayfield, Bartlesville, Okla., assignor to Phillips Petroleum Company, a corporation of Delaware Application March 17, 1941, Serial No. 383,821

4 Claims. (Cl. 202—42)

This invention relates to the processing of mixtures containing unsaturated hydrocarbons for the purpose of separating said unsaturated hydrocarbons therefrom, and more particularly to the distillation and extraction of such mixtures with organic solvents.

Solvent extraction is frequently used to separate olefins from other compounds which are found admixed therewith. The term "olefin" as used in this specification and in the claims includes both mono-olefins and diolefins. Such extraction methods are used especially for treating mixtures having a narrow boiling range which are difficult to separate by simple fractional distillation. Use of the present invention permits the separation of olefins having a purity not otherwise obtainable under given operating conditions, as will hereinafter be more fully explained. Since the separation of diolefins ordinarily presents more difficulties than the separation of mono-olefins, the invention will be described in considerable detail relative to the former, and the general principles of its application to the latter will then be pointed out.

It is an object of this invention to provide a process for the separation of unsaturated hydrocarbons from mixtures containing the same.

Another object of this invention is to provide a process for such separation whereby olefins of almost any desired purity may be obtained in a commercially practicable manner.

A further object of this invention is to provide a process which is useful in separating olefins from hydrocarbon mixtures of relatively wide boiling range, and is especially adapted for recovery of diolefins from mixtures of narrow boiling range which do not lend themselves to separation by simple fractional distillation.

A still further object of this invention is to improve the efficiency of selective organic solvents when used in the distillation and extraction of olefins from hydrocarbon mixtures.

Diolefins may be produced by many different methods, one of the most common being the cracking or dehydrogenation of petroleum oils and gases. In all such methods, the diolefins are found in an impure state, being admixed with hydrogen and with mono-olefins and/or paraffins of various boiling points, as the chief impurities. For most chemical processes in which diolefins are used commercially, it is desirable to have a relatively high concentration of diolefins available, and this is especially true when the diolefins are to be used to form rubber-like polymers, a purity of 95% or better being sometimes required for this purpose. While the hydrogen and the hydrocarbons having boiling points considerably different from the diolefins being purified may be removed easily by fractional distillation, it is very difficult to separate the diolefins from those hydrocarbons having boiling points close to the diolefins, since very efficient fractionation is required, and this is not commercially feasible in most cases, particularly when azeotropes are formed by the diolefins and impurities.

A process which has been used heretofore in the separation of diolefins from other hydrocarbons comprises distilling the hydrocarbon mixture in a combination extraction and rectification column in the presence of a solvent from the class consisting of liquid aldehydes and ketones containing between 10 and 30% of oxygen but no other element except carbon and hydrogen. This class of compounds contains such aldehydes as propionaldehyde, butyraldehyde (normal and iso), valeraldehyde, heptaldehyde, octyl aldehyde, crotonaldehyde, alpha-ethyl hexenal (alpha-ethyl-beta-propyl-acrolein), benzaldehyde, cinnamaldehyde, and such ketones as acetone, methyl ethyl ketone, diethyl ketone, methyl propyl ketone, ethyl propyl ketone, dipropyl ketone, methyl isobutyl ketone, mesityl oxide, cyclohexanone, acetophenone, and diacetone. These solvents are generally completely miscible with diolefins, mono-olefins and paraffins or mixtures thereof. In this process, the liquid solvent is introduced continuously into the top of the column. The hydrocarbon mixture containing the diolefin to be separated is introduced continuously into the column at some intermediate point between the top and the bottom of the column. Overhead and bottom products are withdrawn continuously from the top and the bottom respectively. The diolefins thus introduced which are preferentially dissolved in the solvent are concentrated in the liquid bottom product by means of the repeated extractions and rectifications taking place in the column; likewise, the hydrocarbons thus introduced which are not preferentially dissolved in the solvent are concentrated in the overhead product by the same processes. Both the overhead and bottom products contain relatively large and appreciable proportions of solvent which can be readily separated from the hydrocarbon portions by distillation or other well-known means. This process may also be carried out in batch operation rather than continuously in which case a charge of hydrocarbon plus solvent is placed in the still pot or kettle, and the hydrocarbons which are not preferentially absorbed by the solvent are distilled off through the column counter-current to a stream of solvent introduced continuously into the top of the column, and the diolefins are thus concentrated in the kettle along with a considerable amount of solvent.

The process above described, while giving good separation of diolefins, can be improved upon and made more effective in a manner which will now be discussed in detail. The improved mode of operation is especially effective in the treatment of narrow-boiling range fractions of hydrocarbons containing diolefins because, as stated above, purification by simple fractionation is practically impossible. The separation of diolefins of a purity of up to 98% and even higher from such mixtures is made possible by this invention. However, the process may also be used for treating hydrocarbon mixtures of wide boiling range; for example, the separation of butadiene from a mixture containing propylene, propane, butadiene, butenes, butanes, and heavier hydrocarbons is feasible.

It is known that for efficient separation of diolefins from other hydrocarbons by using solvents of the above-named class, the ratio of solvent to total hydrocarbons in the liquid phase must be relatively high. This is presumably because the ratio of the vaporization equilibrium constants of diolefins to the vaporization equilibrium constants of other hydrocarbons of similar boiling points is less with a high solvent concentration. It has now been discovered that for many solvents, the ratio of solvent to hydrocarbon in the liquid phase drops at some point in the column, thus limiting the percentage yield of diolefins. The present invention solves this difficulty by determining the point at which this drop occurs and then increasing the solvent-hydrocarbon ratio at or near said point in the column by introducing additional solvent into or by abstracting heat from the column near said point. Many solvents other than those of the class of aldehydes and ketones herein referred to, for instance nitrobenzene, phenol, furfural, bis beta dichloroethyl ether, dimethylformamide, etc., are useful in the separation of unsaturated hydrocarbons, and the present invention may be utilized in connection with these solvents as well as those referred to above. The invention may of course be applied to any olefin extraction system in which the above-mentioned decrease in solvent-hydrocarbon ratio occurs.

By way of illustration, reference will be made to the treatment of a specific mixture with a specific solvent of the class herein referred to, namely, a mixture of butadiene with butenes and/or butanes, distilled in the presence of acetone. It has been found that when acetone is introduced only at the top of the column, the liquid phase in some regions in the column, the location of which depends upon the operating conditions, is so deficient in acetone, the deficiency also depending upon operating conditions, that the rate of increase of concentration of butadiene in the hydrocarbon fraction of the liquid phase as the liquid flows downward becomes very small. This sets a limit on the purity of butadiene in the bottom product. This limit can be raised so as to give butadiene of exceptional purity by raising the concentration of acetone in the liquid phase in said regions to a value similar to that maintained in the upper section of the column either by introducing additional acetone into the column at a point near the aforementioned region or by abstracting heat from the region so as to condense more acetone and thus accomplish the same purpose. Any other solvents from the class described, such as butyraldehyde, benzaldehyde, mesityl oxide or dipropyl ketone may be used in a similar manner for extracting butadiene or other diolefins, such as hexadiene or isoprene. The various modes of operation herein described for acetone may also be utilized with other solvents and diolefins by following the principles and procedures herein described modified for the required conditions in a manner obvious to those skilled in the art.

Methods of accomplishing these results will be more completely understood by reference to the following detailed description and accompanying drawings wherein like reference characters refer to like parts. In the drawings:

Figure 1 is a diagrammatic representation of a column with flow of materials into and out of the column indicated;

Figure 2 is a similar diagram showing a different mode of operation;

Figure 3 is a diagram of two columns used in series for accomplishing the invention; and, Figure 4 is a graph showing the concentrations of materials in the liquid phase throughout the column for a typical operation involving butadiene, butene-2 and acetone.

Figure 4:
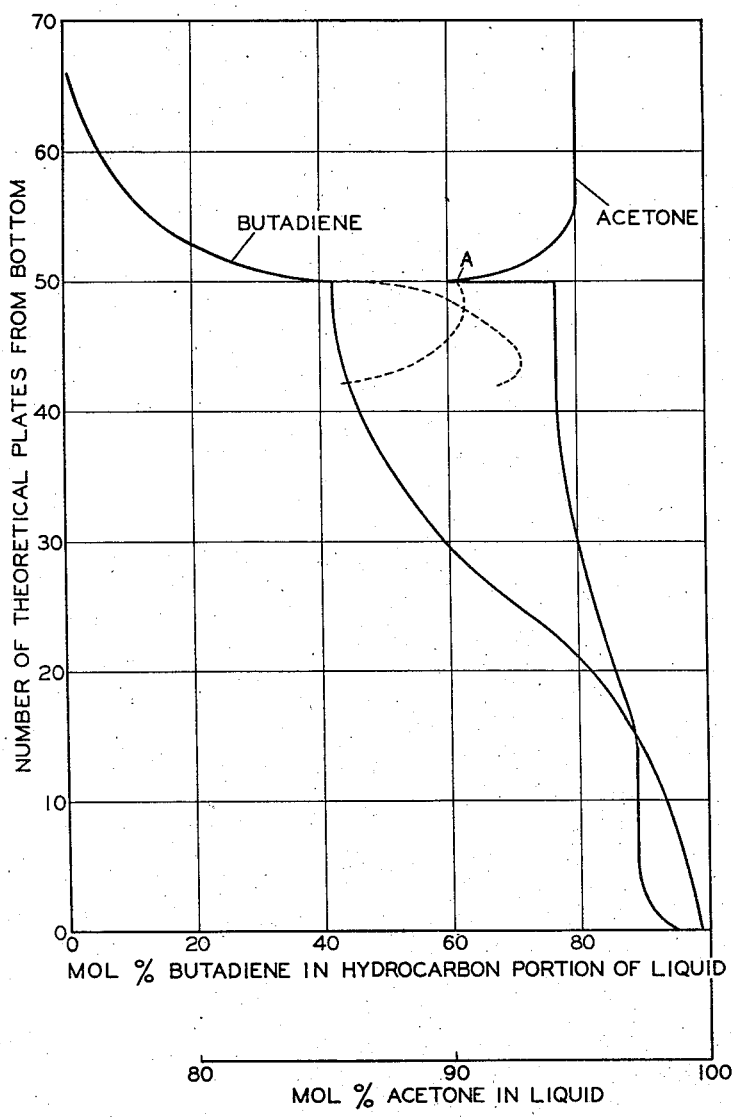

In Figure 1, the numeral 10 designates a fractionation or extraction tower of any approved type, such as bubble cap plate or packed column, into which a stream 11 of hydrocarbons containing diolefins is introduced at a point intermediate the top and bottom of the column, and a stream 12 of solvent is introduced at the top of the column. To effect the objects of the invention, an additional stream 13 of solvent is introduced into the column at a point, governed by the operating conditions, which may be either along with hydrocarbon stream 11 or somewhat above or below the point of entrance of stream 11. The location of this point of entrance of stream 13 and the quantity of additional solvent thus introduced may be determined by operating the column without stream 13, sampling the liquid phase at various levels in the column and analyzing the samples. Or it may be calculated from design data available from the operation of other columns or from other experimental data giving the concentrations of the various materials in the vapor and liquid phases under different conditions of concentration, temperature and pressure. Sufficient solvent is added in stream 13 to maintain the desired solvent to hydrocarbon ratio as previously explained in reference to the separation of butadiene with acetone. The region in the column at which the ratio of solvent in liquid phase to hydrocarbons begins to drop rapidly, thus indicates the approximate point at which introduction of the additional solvent is required. A graphic illustration of a determination of the aforesaid point of introduction is shown in Figure 4 as hereinafter more fully described. When the region of decreasing solvent concentration is close to the point of introduction of the diolefin-containing feed, it will usually be more convenient to introduce the additional solvent along with the feed in a single stream. Heat is supplied to the column by suitable means 14. The solvent flows down through the column and concentrates the diolefins so that a stream 15 of solvent plus hydrocarbons rich in diolefins leaves the bottom of the column. The mono-olefins and/or paraffins present in the feed work their way up in the column and leave a stream 16 of vapors along with some solvent vapors. A portion of stream 16 is condensed by cooler or condenser 17 and sent back into the top of the column as reflux 18. Streams 15 and 16 may be separated into solvent and hydrocarbon portions by distillation or other well-known means. Instead of employing one column as shown in Figure 1, the operation may be carried out in two columns, wherein the overhead vapors of the first column are introduced into the bottom of the second and the liquid products of the second are returned to the top of the first.

In Figure 2, flowing into fractionation or extraction column 10 near the center and top of the column respectively, are a stream 11 of hydrocarbons containing diolefins and a stream 12 of solvent. The column is heated by a steam coil or other means 14. The solvent and diolefins are concentrated in the bottom product which leaves the column as stream 15, and the paraffins and/or mono-olefins, along with some solvent, leave the column in a stream 16, a portion of which is condensed by cooler 17 and sent back into the top of the column as reflux 18. In order to maintain the solvent to hydrocarbon ratio at a sufficiently high value throughout the column, a cooling coil 19 is located in the column at the proper point, which is determined in accordance with the solvent used, the composition of the feed, the design, and efficiency of the column and the operating conditions, as explained with reference to Figure 1, and sufficient heat is abstracted to condense a portion of the solvent vapors in the column, the amount of heat thus removed being determined also by the factors just listed. Of course some hydrocarbon vapors are also condensed, but the quantity of solvent condensed is considerably greater. As described with reference to the operations shown in Figure 1, two or more columns could do the same job, being interconnected so as to give the effect of being one continuous column.

In case the ratio of solvent to hydrocarbon in the liquid phase decreases near the point of introduction of the hydrocarbon feed, the condensation of vapors to increase the ratio may be accomplished advantageously by chilling the feed stream 11 before its introduction into the column, rather than by using cooling coil 19, the condensation of vaporized solvent being thereby effected by contact with the chilled feed.

An operation which is a modification of those shown in Figures 1 and 2 is illustrated in Figure 3. In this case two columns 20 and 21 are used and the diolefin-containing hydrocarbons may be introduced either as stream 11A into the first column 20 or as stream 11B into the column 21. The solvent stream 12 enters the top of column 21. Heat introduced at the bottom of column 20 by heating means 14 causes boiling of the liquid coming down the column. The solvent-diolefin stream 15 leaves the bottom of column 20 and the solvent-paraffin and/or mono-olefin stream 16 leaves the top of column 21, a portion being condensed by cooler 17 and returned to column 21 as reflux 18. Connection is made between the two columns as shown, whereby the vapor stream 22 from the top of column 20 enters the bottom of column 21, and the liquid stream 23 from the bottom of column 21 enters the top of column 20. The maintenance of a sufficiently high solvent-hydrocarbon ratio in the liquid phase is accomplished by condensation of part of stream 22 by condenser or cooler 24, which allows the return of a liquid stream 25 to the top of column 20. Thus cooler 24 in Figure 3 serves a purpose similar to cooling coil 19 in Figure 2 while stream 25 corresponds somewhat to the stream 13 of additional solvent in Figure 1. Of course, the relative heights of the two columns 20 and 21 would have to be determined in a given case in accordance with the principles previously mentioned pertaining to the point at which the solvent-hydrocarbon ratio decreases.

Figure 4 shows two curves representing the theoretical concentrations of butadiene and of acetone in the liquid phase throughout a column being operated in accordance with this invention. A bubble cap plate column equivalent to sixty-six theoretical plates may be run with the operating conditions listed below, which were used in the calculations for Figure 4:

Column pressure .................. 96 lb./sq. in. gauge.
Hydrocarbon feed .................. {40 mols liquid butadiene. 60 mols liquid butene-2.
Solvent feed to top of column .... 2,800 mols liquid acetone.
Solvent feed to 16th theoretical plate from top. 1,000 mols liquid acetone.
Overhead product (theoretical) .... {0.6 mols gaseous butadiene. 59.6 mols gaseous butene-2. 149 mols gaseous acetone.
Reflux ............................ 591 mols liquid (same composition as overhead product).
Bottom product (theoretical) ...... {39.4 mols liquid butadiene. .4 mols liquid butene-2. 3,650 mols liquid acetone.

The dotted curves in Figure 4 show the theoretical concentrations below the 16th theoretical plate from the top when the column is being operated under the same conditions except that no additional acetone is introduced. The solid curves above the dotted curves are the same both for the case in which the extra acetone is introduced and the case in which it is not introduced. At the point A on the acetone curve the value of the ratio of acetone to hydrocarbons in the liquid phase has dropped abruptly from the value maintained in the top of the column and it is substantially at point A that the ratio is increased by means of the present invention. The quantity of extra acetone introduced in the neighborhood of point A, in this case 1000 mols, is calculated so as to be sufficient to raise the acetone concentration determined by analysis or calculations as explained above, to the desired value maintained in the upper portions of the column.

In actual operation, the hydrocarbon feed and the extra acetone may both be introduced into the column at a point corresponding to 50 theoretical plates from the bottom. Theory predicts that the hydrocarbon portion of the bottom product will contain 99 mol per cent butadiene, but in actual practice, due to variations in column efficiency and other factors, this percentage may vary considerably, ordinarily being from about 95 per cent upward to 99 per cent or even higher. The dotted curves in Figure 4 show that without additional acetone, the mol per cent butadiene in the hydrocarbon fraction of the liquid phase will reach a maximum of about 71%. Thus, the use of the principles of this invention permits the separation of butadiene of such a purity as would not otherwise be possible under the given operating conditions.

While the discussion above describes in detail the use of a particular solvent, the phenomena shown are, in general, typical of conditions obtained in the extraction of diolefin-containing hydrocarbon mixtures with the aforementioned solvents, and the scope of the invention is not limited to the particular example described.

The principles and procedures hereinabove disclosed with reference to the separation of diolefins may readily be applied by one skilled in the art to the problem of separating mono-olefins from mixtures containing the same.

As explained with reference to Figure 4, a mixture of mono-olefins and diolefins may be separated with the aid of this invention, whereby diolefins are obtained as a bottom product and mono-olefins are obtained as a top product.

If a mixture of mono-olefins and paraffins be solvent-extracted in accordance with the principles described above, the mono-olefins, being preferentially dissolved by the solvent, will be taken off at the bottom of the column along with some solvent, and the paraffins will leave the column at the top.

In order to separate mono-olefins when found in admixture with both diolefins and paraffins, a two-step process must be used. Treatment in accordance with the principles of my invention separates the mixture into a pure diolefin fraction and a mono-olefin-paraffin fraction. The mono-olefins are then separated out from the paraffins by any known method such as by chemical treatment, fractionation, or solvent extraction. If a solvent extraction step is used, the present invention may be applied to said step with advantage.

The modifications necessary to carry out operations similar to those described in Figures 1, 2, 3 and 4 in batch rather than continuous processes will be easily made by those skilled in the art.

I claim:

1. In a process of separating an aliphatic $C_4$ olefin from a $C_4$ hydrocarbon mixture containing the same and other close-boiling more saturated $C_4$ hydrocarbons which comprises introducing said $C_4$ hydrocarbon mixture continuously into a combination extraction and rectification column at an intermediate point between the top and the bottom of said column, continuously introducing liquid acetone as a selective solvent for said olefin to the top of said column, simultaneously fractionally distilling and solvent extracting said hydrocarbon mixture in said column, supplying heat to the bottom of said column, refluxing the top of said column, continuously withdrawing from the top of said column a stream of hydrocarbon vapors depleted in said olefin, continuously withdrawing from the bottom of said column a stream of said acetone enriched in said olefin, and in which process the ratio of acetone to total hydrocarbons in the liquid phase normally drops sharply at an intermediate critical point in the column to a value so much less than its value in the top of said column as to limit substantially the percentage of the olefin in the hydrocarbon dissolved in the enriched acetone bottom product, the improvement which comprises increasing said ratio of acetone to total hydrocarbons in the liquid phase substantially at said critical point to a value such that below said point said ratio has a volume at least about equal to its value in the top of said column, and thereby substantially increasing the percentage of the olefin in the hydrocarbon dissolved in the enriched acetone bottom product.

2. The process of claim 1 wherein said increase in said ratio is effected by introducing an auxiliary stream of acetone in fresh form substantially at said point in the column at which said drop otherwise occurs.

3. The process of claim 1 wherein said increase in said ratio is effected by abstracting sufficient heat from the contents of said column substantially at said point in the column at which said drop otherwise occurs to cause condensation of such an amount of acetone from the vaporized state to effect said increase.

4. The process of claim 1 wherein said olefin is butadiene.

FRANKLIN D. MAYFIELD.